(12) United States Patent
Do et al.

(10) Patent No.: US 7,305,591 B2
(45) Date of Patent: Dec. 4, 2007

(54) METHOD, APPARATUS AND PROGRAM STORAGE DEVICE FOR PROVIDING DATA PATH OPTIMIZATION

(75) Inventors: Cam-Thuy Do, Sunnyvale, CA (US); Vishal Ghosalkar, San Jose, CA (US); Khoa Khon Ngo, San Jose, CA (US); Wenhua Liu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/582,246

(22) Filed: Aug. 23, 2006

(65) Prior Publication Data

US 2007/0067516 A1   Mar. 22, 2007

Related U.S. Application Data

(63) Continuation of application No. 10/377,359, filed on Feb. 28, 2003.

(51) Int. Cl.
*G06F 11/00* (2006.01)
(52) U.S. Cl. ...................................... 714/43
(58) Field of Classification Search .................. 714/43
See application file for complete search history.

(56) References Cited

U.S. PATENT DOCUMENTS

| | | | |
|---|---|---|---|
| 5,307,491 A | 4/1994 | Feriozi et al. | |
| 5,586,268 A | 12/1996 | Chen et al. | |
| 5,748,980 A | 5/1998 | Lipe et al. | |
| 5,807,175 A | 9/1998 | Davis et al. | |
| 5,854,904 A | 12/1998 | Brown | |
| 6,061,746 A | 5/2000 | Stanley et al. | |
| 6,101,550 A | 8/2000 | Zucker | |
| 6,145,028 A | 11/2000 | Shank et al. | |
| 6,311,228 B1 | 10/2001 | Ray | |
| 6,766,359 B1 * | 7/2004 | Oliveira et al. | 709/213 |
| 6,779,064 B2 * | 8/2004 | McGowen et al. | 710/104 |
| 2001/0016789 A1 | 8/2001 | Staiger | |
| 2002/0032805 A1 | 3/2002 | Parry | |
| 2002/0064149 A1 | 5/2002 | Woo et al. | |
| 2002/0069245 A1 | 6/2002 | Kim | |

OTHER PUBLICATIONS

Microsoft Windows Platform Development, "WDM: Introduction to Windows Driver Model," www.microsoft.com/hwdev/driver/wdm/wdmP.asp, pp. 1-6, printed Jun. 21, 2002.

* cited by examiner

*Primary Examiner*—Michael Maskulinski
(74) *Attorney, Agent, or Firm*—David W. Lynch; Chambliss, Bahner & Stophel PC

(57) ABSTRACT

The present invention is a method, apparatus and program storage device for providing data path optimization for redundant data paths. The present invention provides data path optimization that increases the data access throughput and availability to a device by using multiple paths when a modification event occurs.

20 Claims, 9 Drawing Sheets

METHOD, APPARATUS AND PROGRAM STORAGE DEVICE FOR PROVIDING DATA PATH OPTIMIZATION

BACKGROUND OF THE INVENTION

1. Field of the Invention

The present invention relates to a computer system. More particularly, the present invention relates to a method, apparatus and program storage device for providing data path optimization for redundant data paths.

2. Description of Related Art

In recent years, installed disk storage capacity has seen an almost exponential growth at customer sites. This exponential growth has been coupled with the movement away from direct attached storage to networked storage, be it either storage area network (SAN) or network-attached storage (NAS). Also the movement has resulted in an ever-increasing complexity of the storage management environment.

Implementing a successful application to resolve the complexity of the storage environment is as much an art as it is a science. Companies are increasingly struggling with applications that require extraordinary resources. In some cases, these resources require expensive components plus increased fees for software licensing.

Storage designers and application developers need to address multiple concerns when developing storage solutions. A few of those concerns include multiple data paths, failover, transaction and batch elapsed time, the amount of CPU required to sustain transaction and batch processes, and concurrency. These metrics quantify a storage network and its database's performance. To ensure good performance, designers and developers should incorporate an understanding of the importance of each of these metrics into all of their applications.

Multiple, or redundant, data paths between, for example, a server and a storage subsystem is extremely important for optimum system performance and availability of the storage subsystem. If a failure occurs in the data path between a system server and a remote data storage subsystem, automatic switching of the input/output (I/O) to another path is essential for performance and availability of the system overall.

To improve the performance and availability of data access, from a host to remote data storage subsystems for example, the host machine must be able to access remote data storage subsystems through multiple paths thereby increasing the data access throughput and improve availability, and providing failover protection. A database optimizer works to find the best access path to access data through the multiple paths. The optimizer will figure out the shortest path to the data and determine the least expensive way to complete the work even in the event of a single or multiple path failure. In addition, an I/O workload can be spread over multiple active paths by the optimizer, which can eliminate bottlenecks that occur when many I/O operations are directed to a device, such as a common disk device, across the same path.

An optimizer may also help to reduce I/O transmission time. When tables and indexes to physical devices are designed properly, programs can update a database with information that enables the optimizer to take the minimum path. Finding the best path helps reduce I/O and CPU expenditure and fulfills application requests for data as quickly and as efficiently as possible.

However, in host-to-remote data storage subsystems, an operating system (OS) sees separate bus paths to the same device and the OS is unaware that the separate bus paths are in fact connected to the same device. For example, multiple bus paths may be connected to the same storage subsystem. Hence, when a path fails, a "Write Delay Error" would be generated for that path instead of failing over to another path.

Moreover, current optimization products do not support access to remote devices, such as remote data storage subsystems, through multiple paths on all platforms. For example, one product's algorithm for remote storage through multiple paths may work well on a UNIX™ platform, but not be compatible with an operating system using Plus and Play, such as on a Windows™ platform. On these platforms, which are not fully Plug and Play compatible, write errors are encountered.

It can be seen that there is a need to provide data path optimization for redundant data paths to allow access to devices through multiple paths on multiple platforms.

It can also be seen that there is a need for data path optimization that supports multi-path device operation with Plug and Play compatibility.

SUMMARY OF THE INVENTION

To overcome the limitations in the prior art described above, and to overcome other limitations that will become apparent upon reading and understanding the present specification, the present invention discloses a method, apparatus and program storage device for providing data path optimization for redundant data paths.

The present invention solves the above-described problems by utilizing a virtual device controller providing data path optimization for redundant data paths to increase the data access throughput and availability to a device using multiple paths. The virtual device controller, which provides data path optimization, is fully compatible with a Plug and Play environment.

A virtual device controller for multi-path operation in accordance with the principles of the present invention includes a first driver for detecting a modification event on a data path, and a second driver, coupled to the first driver, for creating a redundant data path for the data path, wherein the first driver communicates the modification event to the second driver, the second driver creating the redundant data path in response to the modification event.

In another embodiment of the present invention, a cluster environment for multi-path operation is provided. The cluster environment includes a memory and a plurality of hosts, wherein each host includes a virtual device controller that includes a first driver for detecting a modification event on a data path and a second driver, coupled to the first driver, for creating a redundant data path for the data path, wherein the first driver communicates the modification event to the second driver, the second driver creating the redundant data path in response to the modification event.

In another embodiment of the present invention, a program storage device is provided. The program storage device tangibly embodies one or more programs of instructions executable by the computer to perform a method for providing multi-path operation, wherein the method includes detecting a modification event on a data path and creating a redundant data path for the data path in response to the modification event.

In another embodiment of the present invention, a method for providing multi-path operation is provided. The method includes detecting a modification event on a data path and creating a redundant data path for the data path in response to the modification event.

In another embodiment of the present invention, another virtual device controller for multi-path operation is provided. This virtual device controller includes a first means for detecting a modification event on a data path and a second means, coupled to the first means, for creating a redundant data path for the data path, wherein the first means communicates the modification event to the second means, the second means creating the redundant data path in response to the modification event.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for providing data path optimization for redundant data paths. The present invention utilizes a virtual device controller to provide data path optimization for redundant data paths to increase the data access throughput and availability to a device by using multiple paths.

Figure 1:
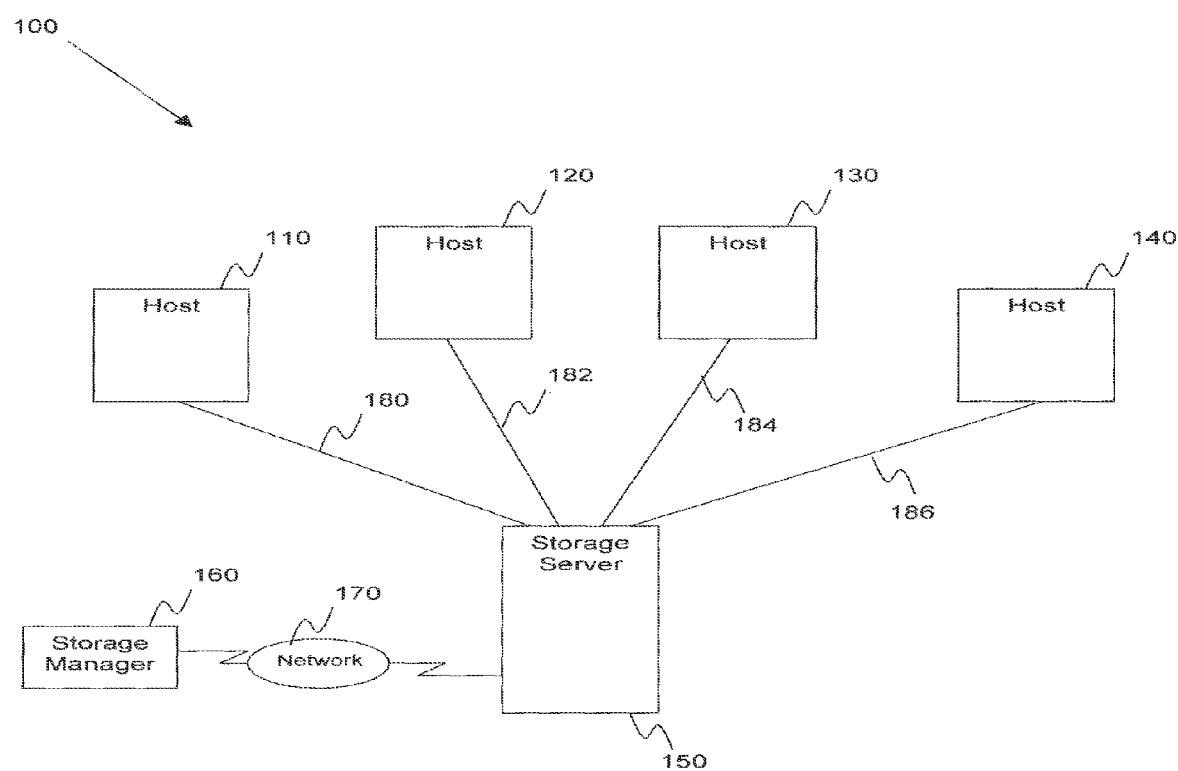
FIG. 1 illustrates a storage subsystem for multiple platforms.

FIG. 1 illustrates a storage subsystem for multiple platforms. A storage system 100 allows the consolidation of data from different platforms on a single high performance, high availability storage server 150. Host servers 110-140 may each use different types of connections 180-186 to connect to the storage server 150, e.g., fibre channel, copper, wireless, etc. However, the present invention is not limited to these connections.

The storage system 100 supports many diverse platforms. For example, the storage system may support IBM, UNIX, WINDOWS and NOVELL host servers 110-140. However, the present invention is not limited to supporting only these servers. The storage server 150 may include, but is not limited to, disk, tape and optical storage media, processors, and software. Virtually all types of servers 110-140 can concurrently attach to the storage server 150. As a result, the storage server 150 can be an external disk storage system as well as a storage system in heterogeneous storage area network (SAN) environments operated by a storage manager 160 via a network 170.

The different servers 110-140 may also use different connection protocols. For example, the storage server 150 is equipped to handle either small computer system interface (SCSI) connectivity, INTEL-based servers or enterprise systems connection (ESCON) technology. However, the present invention is not limited to these technologies.

Figure 2A:
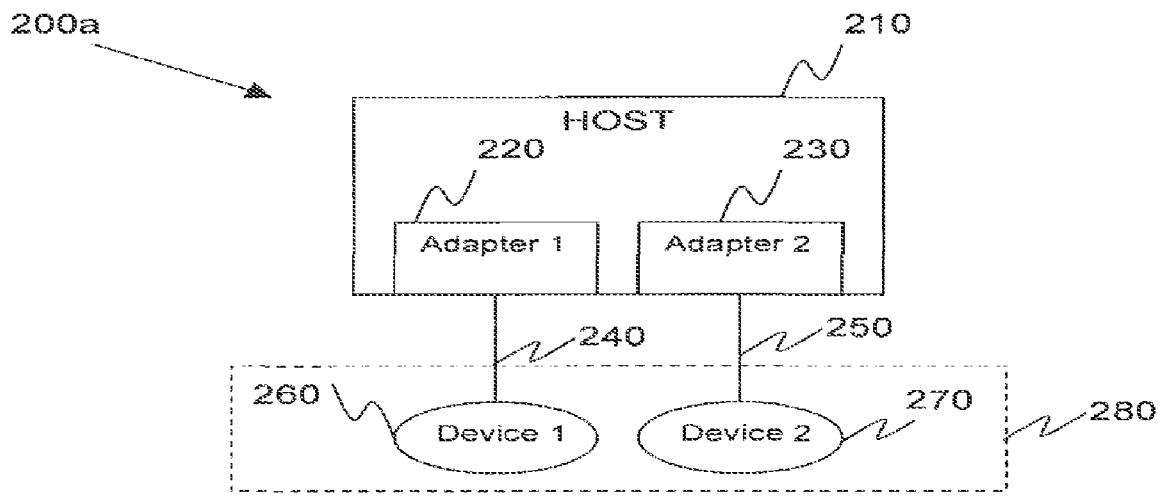
FIGS. 2*a* and 2*b* illustrate an interface to a remote device in a multi-path configuration according to the present invention.
Figure 2B:
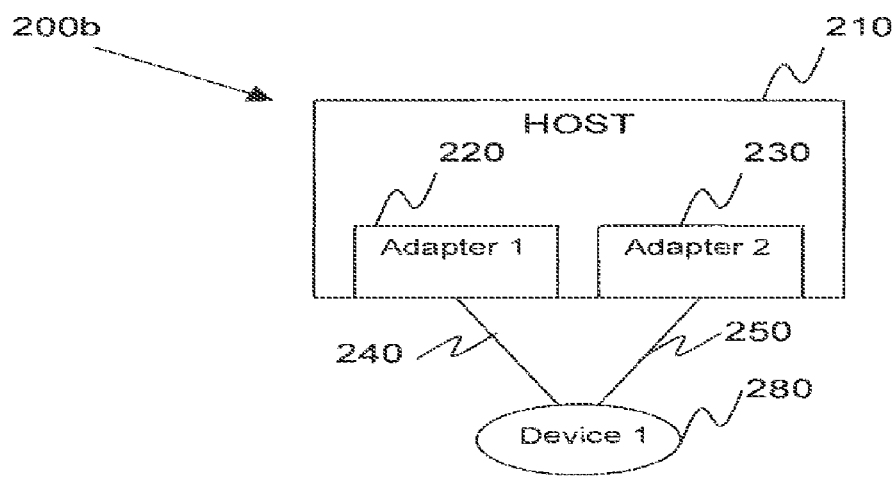

FIGS. 2*a* and 2*b* illustrate an interface to a remote device in a multi-path configuration 200*a*, 200*b* according to the present invention. Multiple host adapters 220, 230 such as SCSI connections can provide a host 210 with internal redundancy. These multiple adapters 220, 230 can provide paths for data flow during input and output operations of the host 210. One goal of this configuration would be to create path redundancy and the ability to switch between these adapters 220, 230, providing multiple paths 240, 250 for the data to travel. Hence, in the event of a failure, I/O operations from a failed path would be automatically rerouted to a remaining path (i.e., failover), optimizing the I/O data paths.

A method for optimizing data path selection is implemented by the host server 210 and be used to create redundant connections 240, 250 between the host server 210 and a device, such as a disk storage subsystem 260-270. The redundant connections 240, 250 can provide data path redundancy and possibly the ability to switch between these devices 260, 270 providing many different paths for the data to travel, enhancing data path performance and availability. Multi-paths 240, 250 could then provide load balancing of data flow and prevent a single path from becoming overloaded, causing input-output (I/O) congestion that occurs when many I/O operations are directed to common devices along the same I/O path.

In FIG. 2*a*, it would be advantageous for a device 280, such as a storage subsystem, to be configured so that the device 280 would appear as two devices 260. 270 on more than one adapter 220, 230, respectively, for the single host 210. This would eliminates a single host adapter, for example adapter 1 220, as a single point of failure, thus increasing availability of data through multiple redundant data paths 240, 250 and also could improve system performance by balancing the subsystem's I/O workload across the multiple paths 240, 250.

Unfortunately, open system operating systems do not recognize or support such a configuration. In FIG. 2*a*, the host's operating system detects separate bus paths 240, 250 to a device 280 as separate devices, i.e., device 1 260 and device 2 270. The operating system is not aware they the devices 260, 270 are in fact the same device 280. For example, in WINDOWS W2K, the paths to a single device 280 will appear as separate disk numbers, device 1 260 and device 2 270, when viewed by a computer management graphics user interface (GUI).

FIG. 2b illustrates an actual configuration 200b of a host interface according to the present invention. The devices 260, 270, as shown in FIG. 2a, are in fact the same device 280. The connections 240, 250 are actually multiple paths to the same device 280. Accordingly, in order to create multi-path configurability, it is necessary to add a virtual device controller with an additional device driver layer to the device I/O driver architecture. This additional device driver layer will recognize devices with multiple access paths 240, 250 and treat them as connecting to a single device 280.

Figure 3:
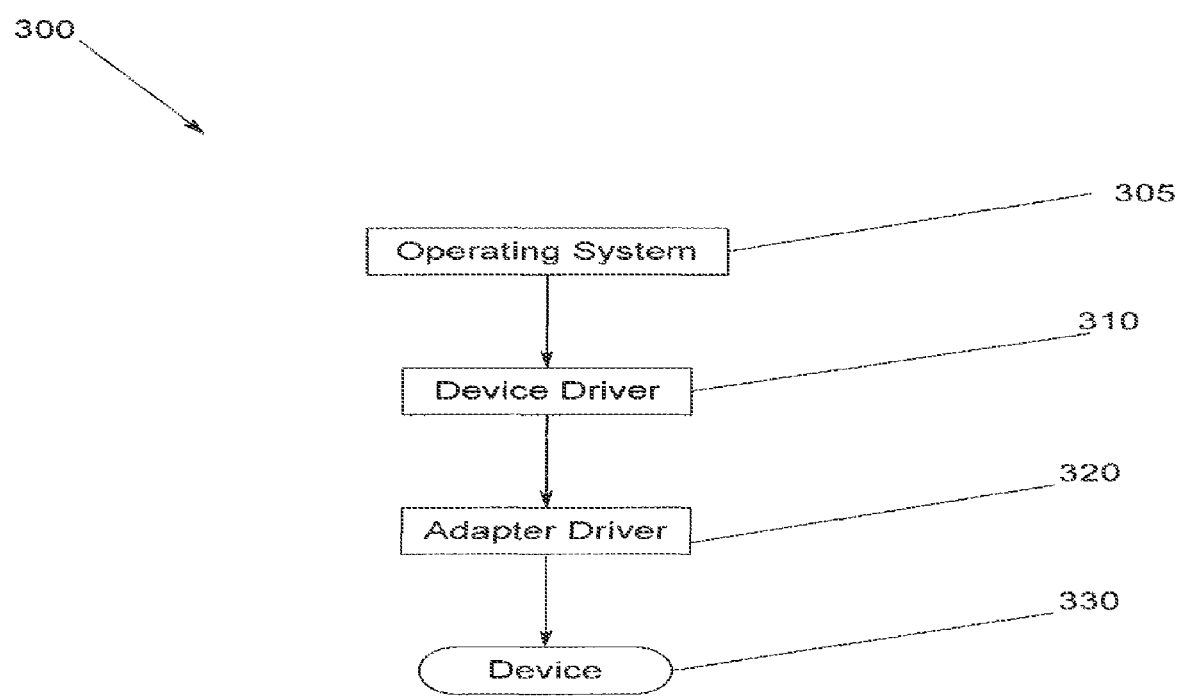
FIG. 3 illustrates a protocol stack without a virtual device controller according to the present invention.

FIG. 3 illustrates a protocol stack 300 without a virtual device controller according to the present invention. In FIG. 3, a device driver 310 forms an interface between an operating system 305 and a device 330. The device driver 310 communicates with an adapter driver 320. The adapter driver 320 is connected via an internal cable to the device 330. The adapter driver 320 is capable of controlling one or more devices 330 connected to the adapter driver 320.

Figure 4:
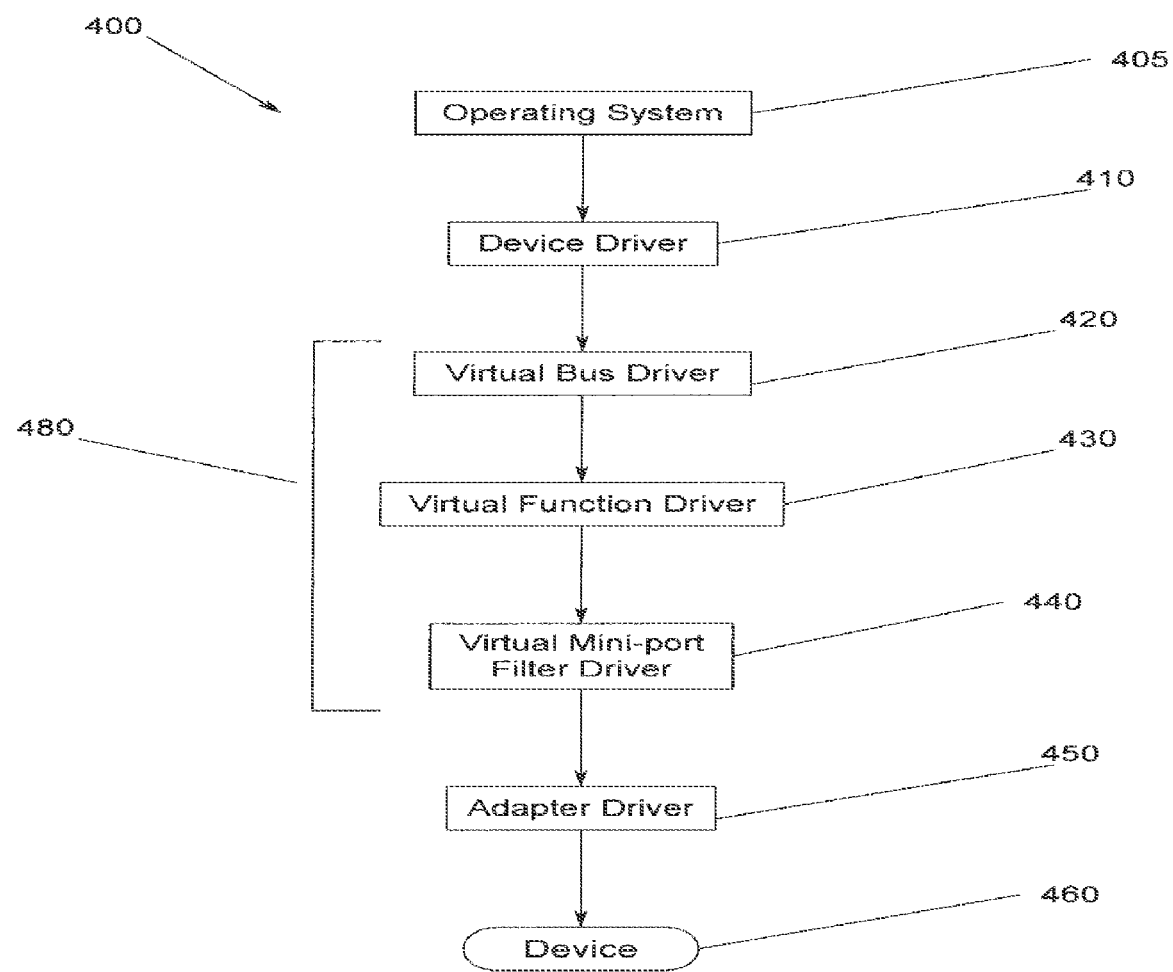
FIG. 4 illustrates a protocol stack having a virtual device controller with Plug and Play(PnP) capabilities according to the present invention.

FIG. 4 illustrates a protocol stack 400 having a virtual device controller with Plug and Play (PnP) capabilities according to the present invention. A Plug and Play environment is a combination of hardware and software support that enables a computer system to recognize and adapt to hardware configuration changes with little or no user intervention. For example, a user can dock a portable computer and use the docking station's Ethernet card to connect to the network without changing the configuration. Later, the user can undock that same computer and use a modem to connect to the network, again without making any manual configuration changes.

The protocol stack 400 having the virtual device controller 480 is designed and implemented to exploit, at least, the multi-path configurability that a host-to-device, such as a host interface to a storage subsystem, may offer. The virtual device controller 480 consists of at least three different drives: a virtual bus driver (bus driver) 420, a virtual function driver (function driver) 430, and a virtual mini-port filter driver (mini-port filter driver) 440. However, the present invention is not limited to these drivers, and addition drivers may be implemented.

The virtual bus driver 420 and virtual function driver 430 are located between the device driver 410 and the adapter 450. However, the present invention is not limited to these driver locations. When loaded, the virtual function driver 430 may registers itself to the virtual bus driver 420. The virtual function driver 430 (or function driver) may be used as a substitute for the MICROSOFT disk class driver, handling all Plug and Play issues.

However, in one embodiment, the virtual function driver 430 doesn't provide any device functions, such as disk functions. Accordingly, a volume manager, which may be located in the operating system 405, and other storage components located above the function drive 430 in the protocol stack 400 cannot mount and use, for example, the disk devices driven by this virtual function driver 430. Hence, all paths to a physical device 460, such as a storage subsystem (disk), are hidden. However, the present invention is not limited to this embodiment and alternate embodiments may be implemented providing the virtual function driver 430 with additional device functionality.

The virtual bus driver 420, which may be loaded at boot time, creates a virtual device and a new data path, i.e., it identifies devices on its bus and create device objects for them. However, the present invention is not limited to this loading time. For example, the virtual bus driver 420 will create a virtual disk device for every physical disk connected to a host and exposes this physical disk device to the OS 405.

Accordingly, the virtual bus driver 420 can handle multi-path access to physical devices 460. Also, the virtual bus driver 420 controls all Plug and Play aspects of the virtual devices that it creates.

The virtual mini-port filter driver 440 can modify the behavior of device hardware or add additional security features. The virtual mini-port filter driver 440 may be loaded at boot time. However, the present invention is not limited to this loading time.

The virtual mini-port filter driver 440 can be used to scan a list of devices stored in a memory location. The virtual mini-port filter driver 440 will remove any of the devices in the list that the virtual mini-port filter driver 440 is directed to by an operator, software command, operating system etc. However, the virtual mini-port filter 440 of the present invention is not limited to these directions. A virtual mini-port filter driver 440 is optional and can exist in any quantity, placed above or below the virtual function driver 430 and above the virtual bus driver 420.

Figure 5:
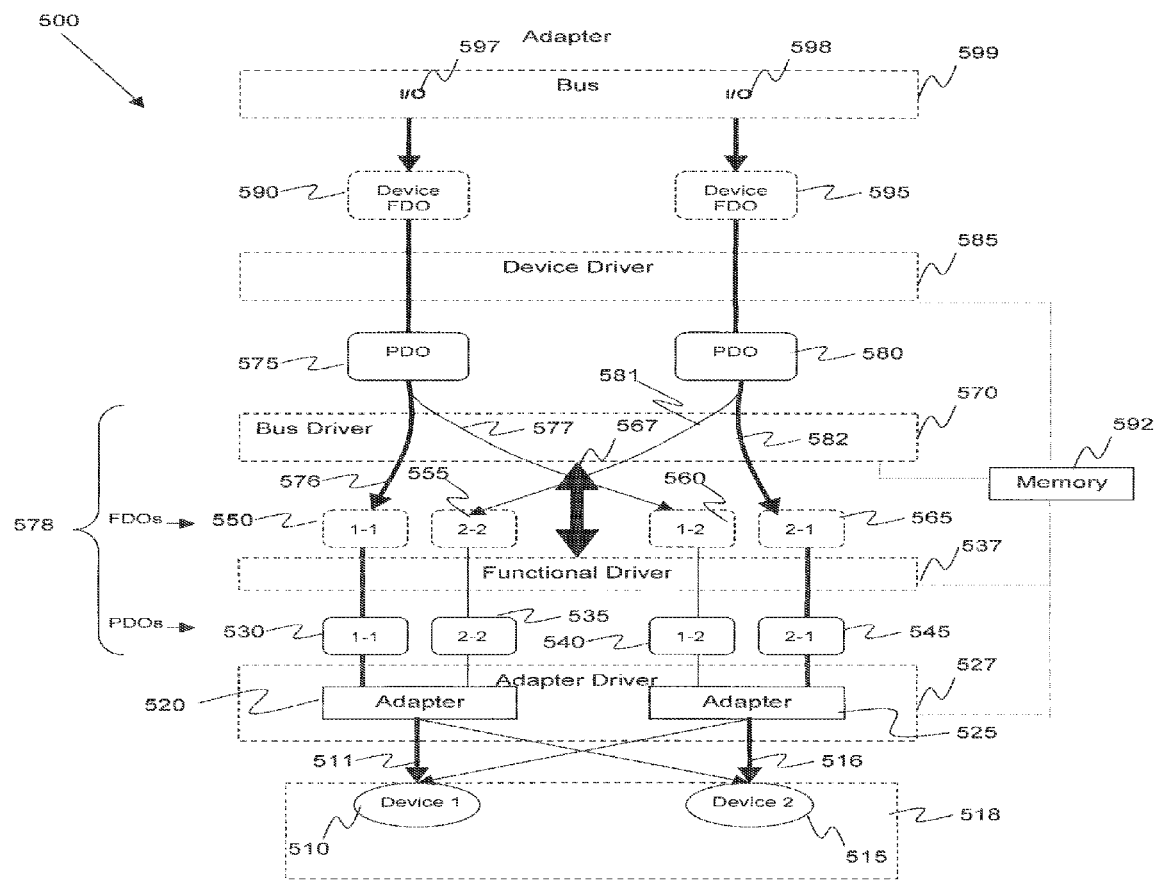
FIG. 5 illustrates an architecture having a virtual device controller according to the present invention.

FIG. 5 illustrates an architecture 500 having a virtual device controller according to the present invention. An I/O system provides a layered architecture for drivers. In general, a driver creates device objects for each device it controls; the device objects represent the device to a device driver. From the Plug and Play perspective, there are at least three kinds of device objects. As presently defined, these device objects include physical device objects (PDOs), functional device objects (FDOs), and filter device objects.

According to the present invention, PDOs 575, 580 represent devices 510, 515, respectively, connected to a bus 599. Every Plug and Play application program interface (API) that refers to the devices 510, 515 refers to the PDOs 575, 580. For example, an API referring to device 1 510 may refer to PDO 575 and an API referring to device 2 510 may refer to PDO 580.

FDOs represent the functionality of a device 518 to a function driver 537. For example, the FDOs 550, 555 represent the functionality of the device 1 510 to the function driver 537. FDOs are used to, but are not limited to, servicing device PDOs by passing I/O requests down to the adapter ports 527. For example, device FDOs 590, 595 may service PDOs 575, 580 for a device driver 585.

The FDOs 550, 555, 560, 565 are loaded, for example, when adapters 520, 525 detect a modification event such as a device 518 connected to an I/O path 511, 516 during a Plug and Play event. A modification event is any event that requires a modification or configuration to a system such that the system requires a mapping or remapping of the systems data paths.

When an FDO is loaded due to a modification event, such as a Plug and Play event for example, the function driver 537 reports the modification event to a bus driver 570. In this way, a connection 567 between the function driver 537 and the bus driver 570 is created. The bus driver 570 then may register this FDO 550, 555, 560, 565 to a PDO 530, 535, 540, 545, respectively.

To register an FDO 550, 555, 560, 565 to a PDO 530, 535, 540, 545, the bus driver 570 may first search a memory location 592 including a PDO list to see if a new PDO 530, 535, 540, 545 should be created. If a new PDO needs to be created, the bus driver 570 will create a new PDO 530, 535, 540, 545 and register the FDO 550, 555, 560, 565 to the new PDO 530, 535, 540, 545, else, the FDO 550, 555, 560, 565 is registered to an existing PDO 530, 535, 540, 545 found in the list. Also, along with the creation of the PDO 530, 535, 540, 545 a new path 576, 581, 577, 582 is created, respectively.

When a path 576, 581, 577, 582 is removed, the function driver 537 reports this modification event to the bus driver 570, whereby the bus driver 570 will remove the corresponding FDO 550, 555, 560, 565. The bus driver 570 will also search the PDO list to see if the PDO 530, 535, 540, 545 should be removed.

An open system operating system creates separate bus paths 576, 582 to a device 518 and treats the device 518 as separate devices 510, 515 (i.e., I/O 597 to device 1 510 via path 576 and I/O 598 to device 2 515 via path 582). Accordingly, the operating system is not aware that the separate devices 510, 515 are in fact the same device 518. For example, in WINDOWS W2K, the paths 511, 516 to a single device 518 will appear as paths to separate devices 510, 515 having different disk numbers (e.g., device 1 510 and device 2 515) when viewed by a computer management graphics user interface (GUI). If a failure occurs on a path 576, 582, no failover to another path 577, 581 will occur.

In operation, when the device 518 is connected to the architecture 500 (i.e., a modification event), the adapters 520, 525 detect the presence of the device 518 and report the device 518 to the operating system (OS). The OS sees the device 518 as two separate devices having two separate paths 576, 582 as discussed above. Hence, according to the present invention, a virtual device controller 576 is utilized to provide redundancy and availability to the device 518 by creating additional paths 577, 581 to device 518. The virtual device controller 578 accomplished this by additional device drivers in the architecture of the protocol stack 400 as shown in FIG. 4 and the architecture 500 of FIG. 5.

Before any I/O communication occurs, a determination is made as to if a modification event, such as Plug and Play event, has occurred. A modification event may occur when a device is added or removed to the bus 599 as detected by adapters 520, 525. However, one skilled in the art will realize that numerous other modification events exist. When a modification event, such as a Plug and Play event, on a path occurs, the function driver 537 handles the event that signals the bus driver 570. Using this event, bus driver 570 can change an I/O path state, e.g., from one path 576 to another 577.

In the architecture 500 according to the present invention, configuration of the virtual device controller 578 occurs when a modification event, such as a newly added device 518 is detected on the adapters 520, 525. The function driver 537 signals the bus driver, and the bus driver determine if a PDO 530, 535, 540, 545 should be created or not, if a PDO should be removed, or if a path should be added or removed, or the state of a path should be updated for the newly detected device 518.

More specifically, when the bus driver 570 is signaled, the bus driver 570 creates a new underlying FDO 550, 535, 560, 565, then searches a PDO list to find a PDO 530, 535, 540, 545 to register the FDO 550, 535, 560, 565 to. If no PDO is found, the bus driver 570 create a new PDO 530, 535, 540 545, then register FDO 550, 535, 560, 565 to this new PDO, respectively, and informs a modification event manager, such as a Plug and Play manager, to enumerate it. If a PDO already exists, the new FDO 550, 535, 560, 565 is registered to the existing PDO. Hence, the bus driver 570 creates new and redundant paths 576, 577, 581, 582 to the device 518. The redundant paths 576, 577, 581, 582 also providing load balancing and greater device availability.

Figure 6:
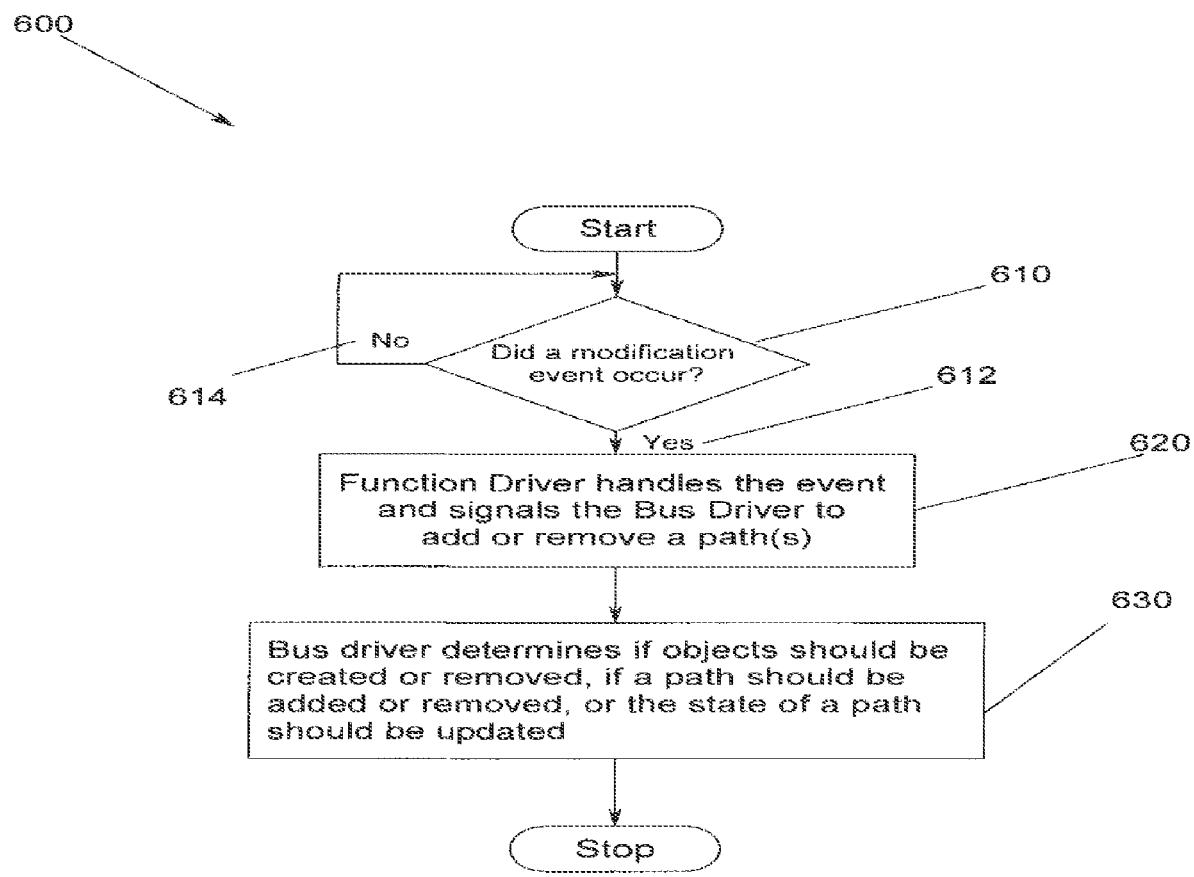
FIG. 6. is a flow diagram illustrating the configuration of the virtual device controller.

FIG. 6 is a flow diagram 600 illustrating the configuration of the virtual device controller. Before any I/O communication occurs, a determination is made as to if a modification event has occurred. The function driver determines if a modification event has occurred 610. If a modification event has occurred 612, the function driver notifies the bus driver as to the event 620. If a modification event does not occurred 614, the function driver will continue to monitor for a modification event.

Accordingly, when the individual adapters detect a modification event, such as a Plug and Play event, the adapters report the device to the operating system (OS). However, due to the separate adapters, the OS sees the single device as two separate devices. The bus driver then determines if a PDO should be created, if a PDO should be removed, if a path should be added or removed, or the state of a path should be updated 630. The present invention is not limited to these actions by the bus driver.

In this manner, according to the present invention, a virtual controller creates redundant paths to the connected device. Further, the virtual controller provides high availability to the device and I/O load balancing via additional paths. Hence, when there is a path component failure, I/O will be intelligently rerouted through another adapter connected to the same device.

Figure 7:
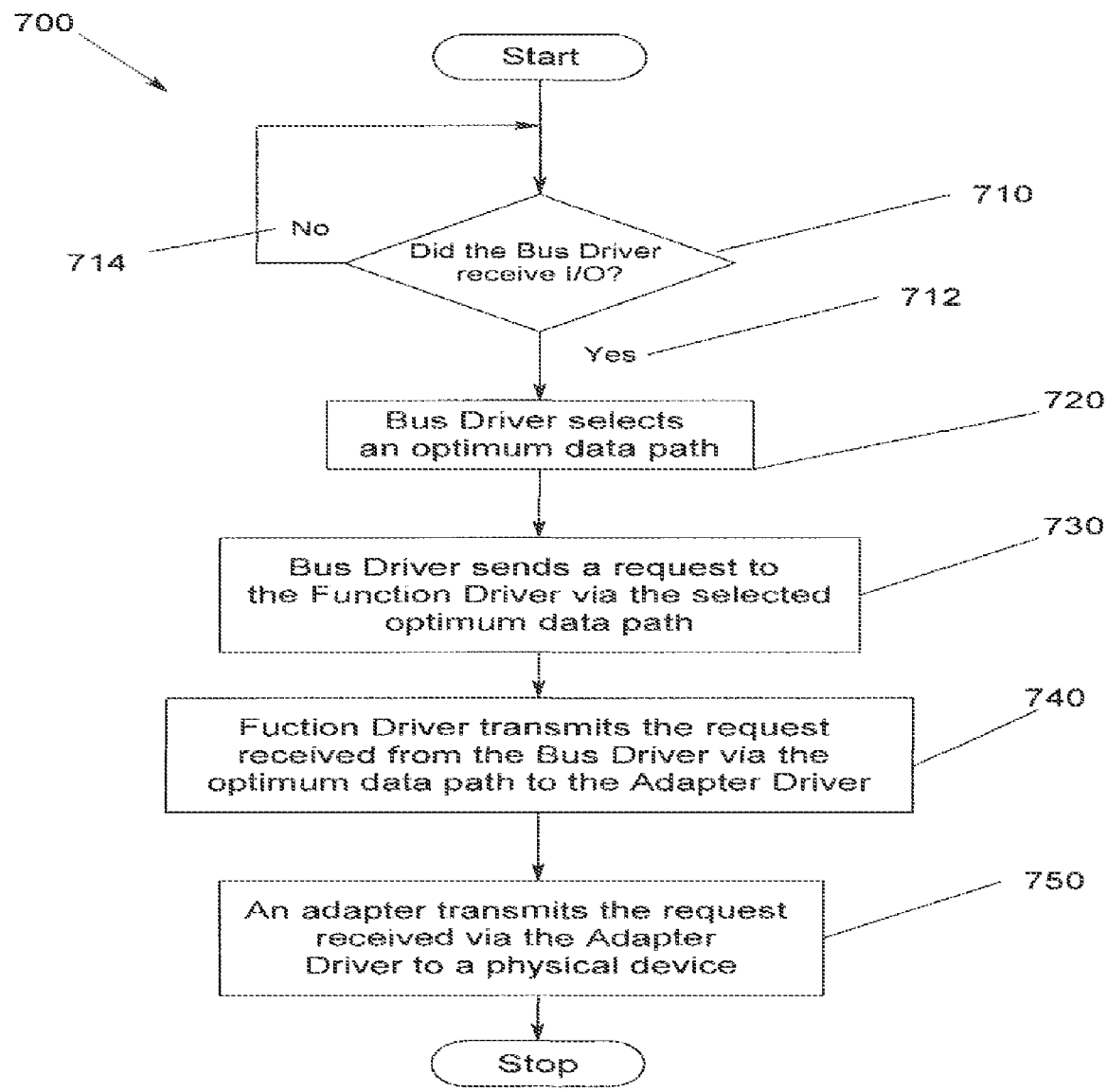
FIG. 7 is a flow diagram illustrating I/O operation of the virtual device controller according to the present invention.

FIG. 7 is a flow diagram 700 illustrating I/O operation of the virtual device controller according to the present invention. A system determines whether the bus driver receives an I/O request 710. If a bus driver receives an I/O request 712, it selects an optimum data path from a search the memory location (FIG. 5, 592) including a list of available paths using a data path optimization method 720. The system waits otherwise 714. Then the bus driver sends this I/O request to the function driver 730 via the selected optimum data path. The function driver sends the request received from the bus driver via the optimum data path to the adapter driver 740. An adapter receives the request from the adapter driver and transmits the request this request to a physical device 750.

According to the present invention, the PDOs created by bus driver are also devices. When an I/O request for a specific PDO is received, the bus driver routes this I/O request to a specific path that corresponds to a specific FDO serviced by the function driver, and on to the specified PDO.

Figure 8:
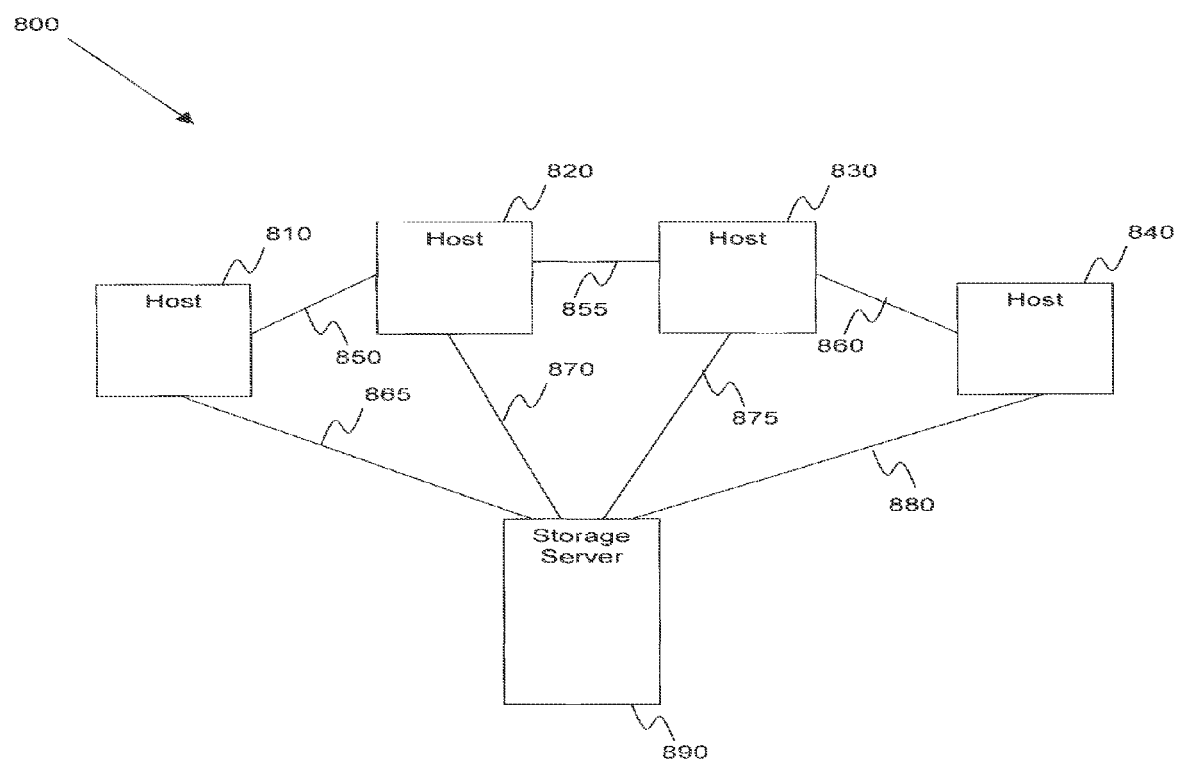
FIG. 8 illustrates a cluster environment with Plug and Play compatability according to the present invention.

FIG. 8 illustrates a cluster environment 800 with Plug and Play compatibility according to the present invention. Host servers may be configured with multiple host adapters and/or SCSI connections 850-880 to a storage server 890. FIG. 8 shows that hosts 810-840 may be attached through a SCSI, fibre-channel or other type of interface 850-880 to other hosts 810-840 or a storage server 890, hence, providing component redundancy and a multi-path configuration. In the cluster environment 800, clusters having multiple host interfaces 850-880 provide more flexibility in the number of I/O paths that are available. When there is a failure, the data path may be optimized by rerouting I/O operations from the failed path to any remaining paths.

Figure 9:
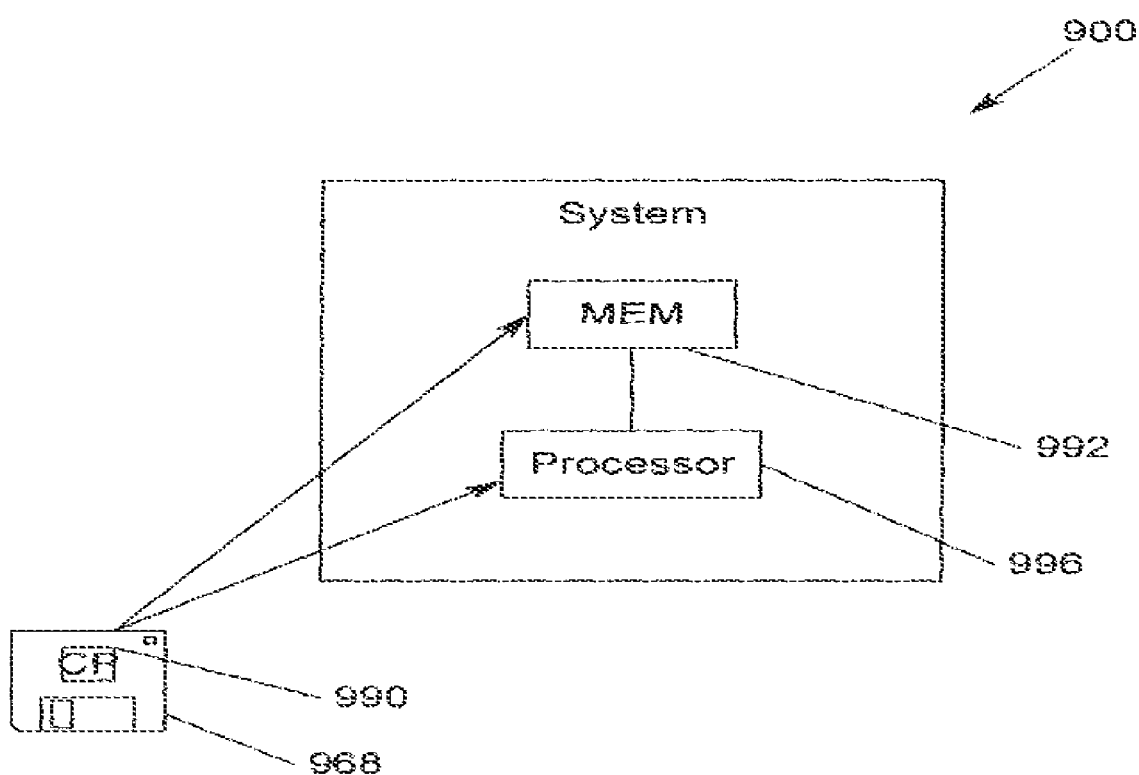
FIG. 9 illustrates a system according to the present invention.

FIG. 9 illustrates a virtual controller system 900 that provides data path optimization according to the invention as illustrated with reference to FIGS. 1-8 using an executable program readable from a storage driver program. The process illustrated with reference to the present invention may be tangibly embodied in a computer-readable medium or carrier, e.g. one or more of the fixed and/or removable data storage devices 968 illustrated in FIG. 9, or other data storage or data communications devices. A computer program 990 expressing the processes embodied on the removable data storage devices 968 may be loaded into the memory 992 or into the system 900, e.g., in a processor 996, to configure the system 900 of FIG. 9, for execution. The computer program 990 comprise instructions which, when read and executed by the controller 900 of FIG. 9, causes the system 900 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A virtual device controller for multi-path operation, comprising:
    a virtual function driver for detecting a modification event and reporting the modification event; and
    a virtual bus driver, coupled between the virtual function driver and a device driver, for providing a first path between a first physical device object of the device driver and a first virtual functional device object for coupling with a first adapter and for providing a second path between a second physical device object of the device driver and a second virtual functional device object for coupling with a second adapter, the virtual bus driver registering virtual physical device objects with appropriate virtual functional device objects;
    wherein the virtual bus driver is configured to create a first redundant path between the first physical device object of the device driver and a third virtual functional device object for coupling to the second adapter in response to the reporting of the modification event related to objects associated with the first adapter and to create a second redundant path between the second physical device object of the device driver and a fourth virtual functional device object for coupling to the first adapter in response to the reporting of the modification event related to objects associated with the second adapter.

2. The virtual device controller of claim 1, wherein the virtual function driver is disposed logically above an adapter driver in a protocol stack and the virtual bus driver is disposed logically above the virtual function driver and below a device driver.

3. The virtual device controller of claim 1, wherein the virtual bus driver determines when physical device objects should be created, when physical device objects should be removed, when a path between a physical device object of a device driver and virtual functional device objects should be added, when a path between a physical device object of a device driver and virtual functional device objects should be removed, and when a state of a path should be updated.

4. The virtual device controller of claim 1 further comprising a memory including a virtual physical device object list that is scanned by the virtual bus driver to determine when a virtual physical device object exists for controlling multi-path access.

5. The virtual device controller of claim 1, wherein the virtual bus driver determines when a data path should be added or removed for controlling multi-path access from a physical device object of a device driver to a physical device.

6. The virtual device controller of claim 1, wherein the virtual bus driver determines when the states of a path should be updated for controlling multi-path access.

7. The virtual device controller of claim 1, wherein the virtual bus driver is configured for increasing availability to the physical device and improving system performance by balancing an I/O workload across multiple paths between the physical device object of a device driver and virtual functional device objects.

8. The virtual device controller of claim 1 further comprising a third device driver for modifying the behavior of physical device hardware.

9. The virtual device controller of claim 8, wherein the third device driver scans a memory including a list of devices for removing any of the devices in the list.

10. The virtual device controller of claim 1, wherein the virtual function driver creates a virtual functional device object for a newly added physical device causing the modification event.

11. A cluster environment for multi-path operation, comprising:
    a memory; and
    a plurality of hosts, wherein each host includes a virtual device controller comprising:
        a virtual function driver for detecting a modification event and reporting the modification event; and
        a virtual bus driver, coupled between the virtual function driver and a device driver, for providing a first path between a first physical device object of the device driver and a first virtual functional device object for coupling with a first adapter and for providing a second path between a second physical device object of the device driver and a second virtual functional device object for coupling with a second adapter, the virtual bus driver registering a virtual physical device objects with appropriate virtual functional device objects;
    wherein the virtual bus driver is configured to create a first redundant path between the first physical device object of the device driver and a third virtual functional device object for coupling to the second adapter in response to the reporting of the modification event related to objects associated with the first adapter and to create a second redundant path between the second physical device object of the device driver and a fourth virtual functional device object for coupling to the first adapter in response to the reporting of the modification event related to objects associated with the second adapter.

12. A program storage device, comprising:
    program instructions executable by a processing device to perform operations for providing file system charge back accounting data, the operations comprising:
    detecting a modification event;
    reporting the modification event to a virtual bus driver;
    providing a first path between a first physical device object of the device driver and a first virtual functional device object for coupling with a first adapter;
    providing a second path between a second physical device object of the device driver and a second virtual functional device object for coupling with a second adapter,
    registering virtual physical device objects with appropriate virtual functional device objects;
    creating a first redundant path between the first physical device object of the device driver and a third virtual functional device object for coupling to the second adapter in response to the reporting of the modification event related to objects associated with the first adapter; and
    creating a second redundant path between the second physical device object of the device driver and a fourth virtual functional device object for coupling to the first adapter in response to the reporting of the modification event related to objects associated with the second adapter.

13. The program storage device of claim 12, wherein the creating the first and second redundant data paths in response to the modification events further comprises providing a notification when a modification event has occurred.

14. The program storage device of claim 13, wherein the providing the notification further comprises providing information for selecting an optimum data path by a virtual bus driver in response to information received from a virtual functional driver by providing control of multi-path access to the physical device.

15. The program storage device of claim 14, wherein the providing control of multi-path access further comprises determining when a physical device object should be created or removed.

16. The program storage device of claim 14, wherein the providing control of multi-path access further comprises determining when a data path should be added or removed.

17. The program storage device of claim 14, wherein the providing control of multi-path access further comprises optimizing data path selection to balance I/O workload across multiple paths.

18. The program storage device of claim 12 further comprising modifying the behavior of physical device hardware.

19. The program storage device of claim 12 further comprising searching a physical device object list to see if a virtual physical device object exists for a virtual functional device object, registering the virtual functional device object with the virtual physical device object when the virtual physical device object exists in the list, else creating a new virtual physical device object for registering the virtual functional device object.

20. The program storage device of claim 12 further comprising coupling the first redundant data path and the first path to a same physical device in response to the modification event.

* * * * *